(12) United States Patent
Krooss et al.

(10) Patent No.: US 6,174,122 B1
(45) Date of Patent: Jan. 16, 2001

(54) PALLET UNLOADING APPARATUS AND METHOD

(75) Inventors: Robert J. Krooss, Mountain Lakes; Kenneth F. Regula, Sparta; Michael A. Tully, Union City, all of NJ (US)

(73) Assignee: Pace Packaging Corporation, Fairfield, NJ (US)

( * ) Notice: Under 35 U.S.C. 154(b), the term of this patent shall be extended for 0 days.

(21) Appl. No.: 09/245,115

(22) Filed: Jan. 25, 1999

(51) Int. Cl.⁷ .................................................. B65G 59/08
(52) U.S. Cl. ........................ 414/412; 414/404; 414/419; 414/810
(58) Field of Search .................................. 414/404, 411, 414/412, 417, 419, 421, 810, 761, 762, 773, 778, 822, 929

(56) References Cited

U.S. PATENT DOCUMENTS

| | | |
|---|---|---|
| 1,898,393 | 2/1933 | Rickers . |
| 2,466,693 * | 4/1949 | Fischer ................................. 414/417 |
| 2,543,578 | 2/1951 | Hutaff . |
| 2,975,911 * | 3/1961 | Wedensky ............................ 414/929 |
| 2,994,444 * | 8/1961 | Peterson et al. ..................... 414/929 |
| 3,045,846 * | 7/1962 | Clark .................................... 414/416 |
| 3,075,652 * | 1/1963 | McCoy ................................. 414/417 |
| 3,490,630 | 1/1970 | Sullivan . |
| 3,543,949 | 12/1970 | Weier . |
| 3,702,660 * | 11/1972 | Berger ................................... 414/778 |
| 3,724,686 | 4/1973 | Nelson . |
| 3,753,509 | 8/1973 | Kock . |
| 3,777,913 * | 12/1973 | Schieser et al. ..................... 414/411 |
| 4,037,734 | 7/1977 | Erdman . |
| 4,405,278 * | 9/1983 | Kvalheim ............................. 414/411 |
| 4,527,940 | 7/1985 | Biery . |
| 4,681,209 | 7/1987 | Marti . |
| 5,033,929 | 7/1991 | Marti . |
| 5,069,594 * | 12/1991 | Bott et al. ............................. 414/416 |
| 5,161,934 | 11/1992 | Richardson . |
| 5,244,330 | 9/1993 | Tonjes . |
| 5,364,224 * | 11/1994 | Padgett ................................. 414/419 |
| 5,415,322 | 5/1995 | Sala . |
| 5,607,282 | 3/1997 | Brannen et al. . |

FOREIGN PATENT DOCUMENTS

| | | | |
|---|---|---|---|
| 4114739 * | 11/1992 | (DE) .................................... 414/778 |
| 373091 * | 6/1990 | (EP) ..................................... 414/419 |
| 1518256 * | 10/1989 | (SU) .................................... 414/419 |

* cited by examiner

Primary Examiner—Douglas Hess
(74) Attorney, Agent, or Firm—Stephen E. Feldman, P.C.

(57) ABSTRACT

A carrier container having sides, ends and a bottom defining an open face holding chamber, is provided for loading a stack of tiers loaded on a pallet into the holding chamber. The stack of tiers comprises a plurality of tier sheets, each supporting a plurality of products aligned in groups on each tier. The tier sheets are disposed vertically, defining a stack. The stack is positioned on and secured to the pallet. Loading of the stack of tiers and pallet into the holding chamber is accomplished with the holding chamber in a vertical orientation. After loading the stack of tiers and pallet into the holding chamber the carrier container is rotated from a vertical orientation to a horizontal orientation, securing the stack of tiers and pallet in the holding chamber. Each of the tier sheets is removed from the stack destroying the stack and displacing the products from the stack, the products retained in the holding chamber. One of the ends which defines a part of the holding chamber is collapsed into a pouring spout and the carrier container is rotated toward the pouring spout for unloading the plurality of products from the holding chamber.

10 Claims, 3 Drawing Sheets

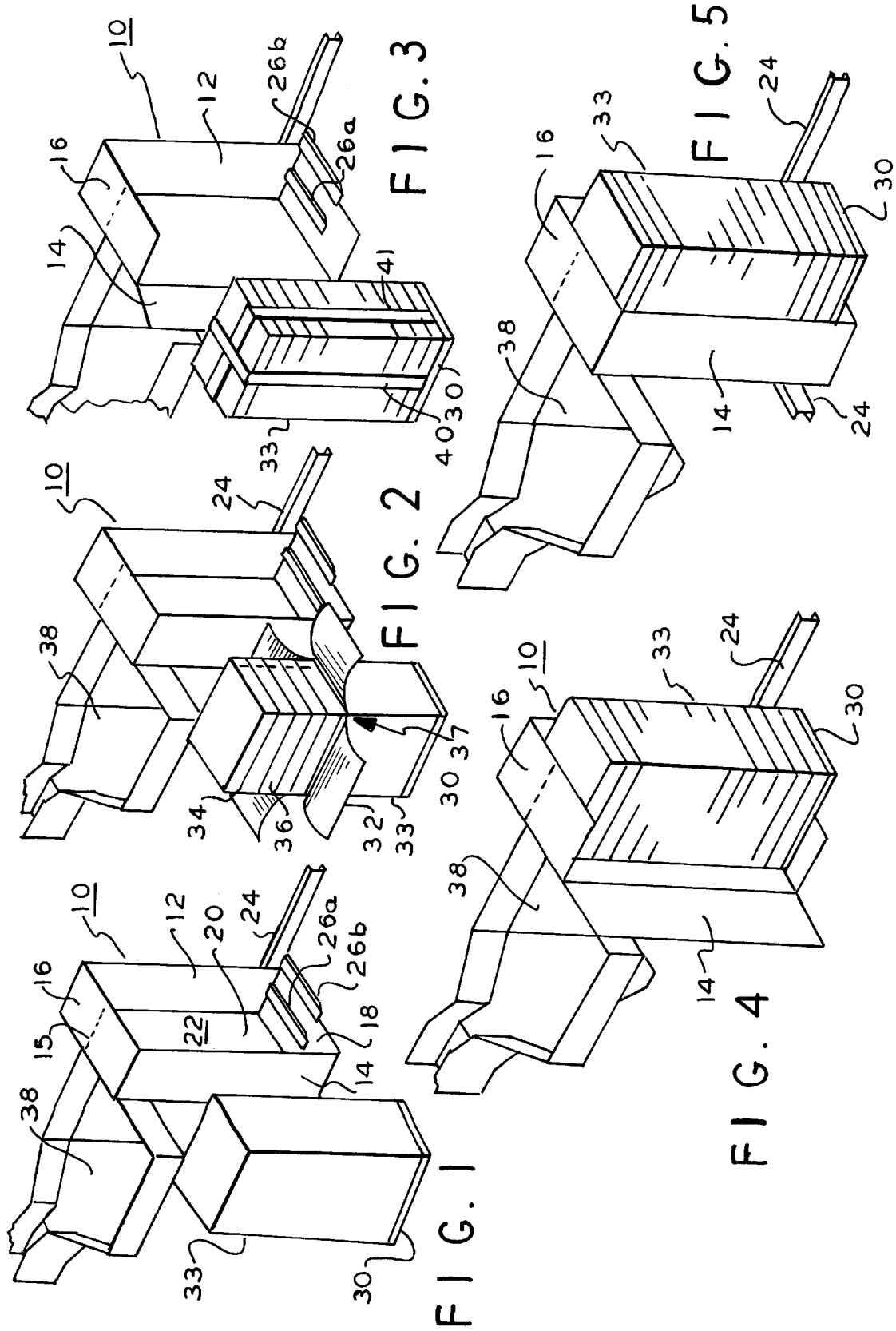

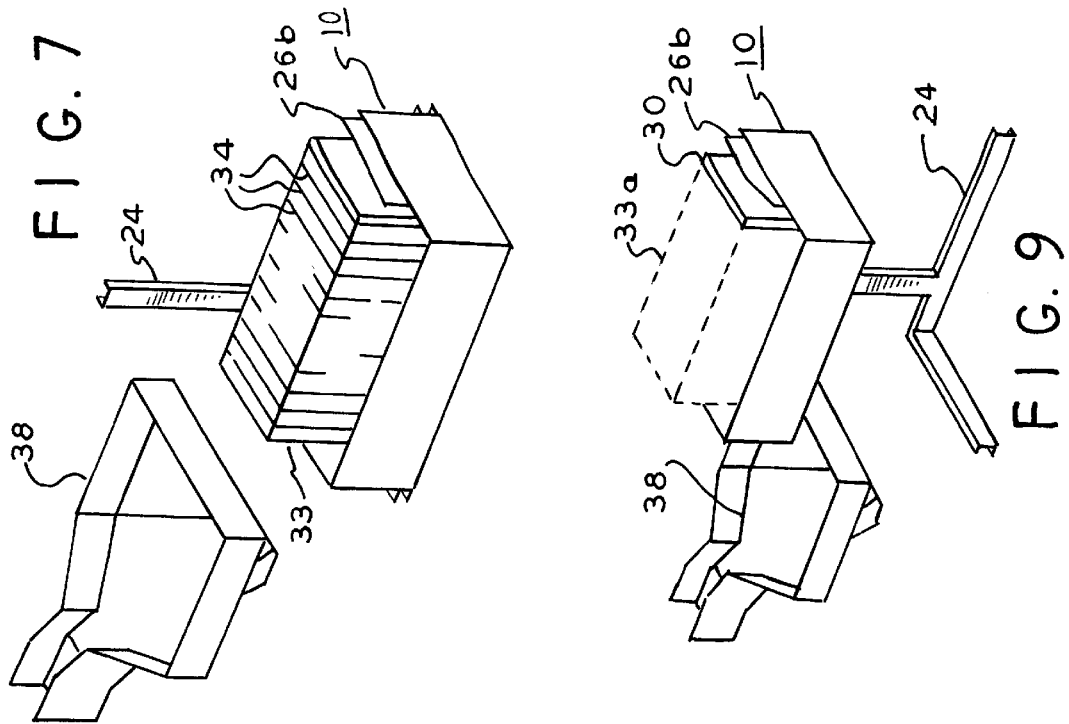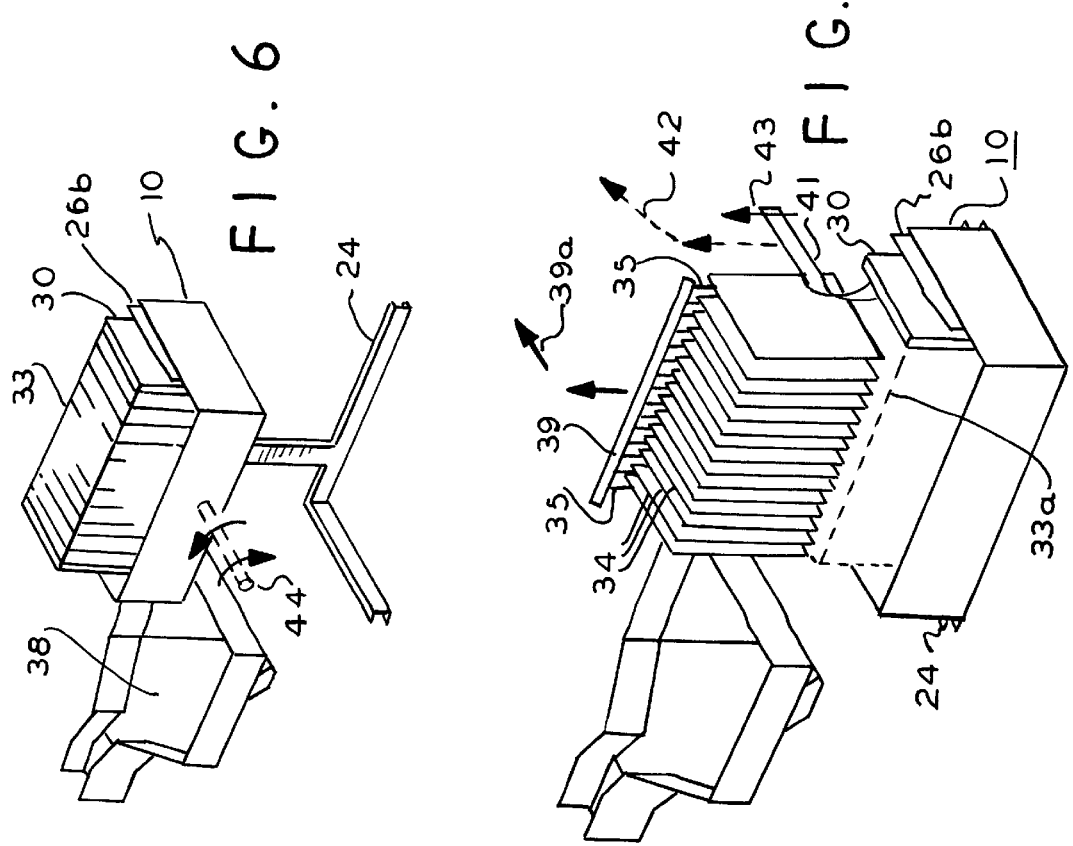

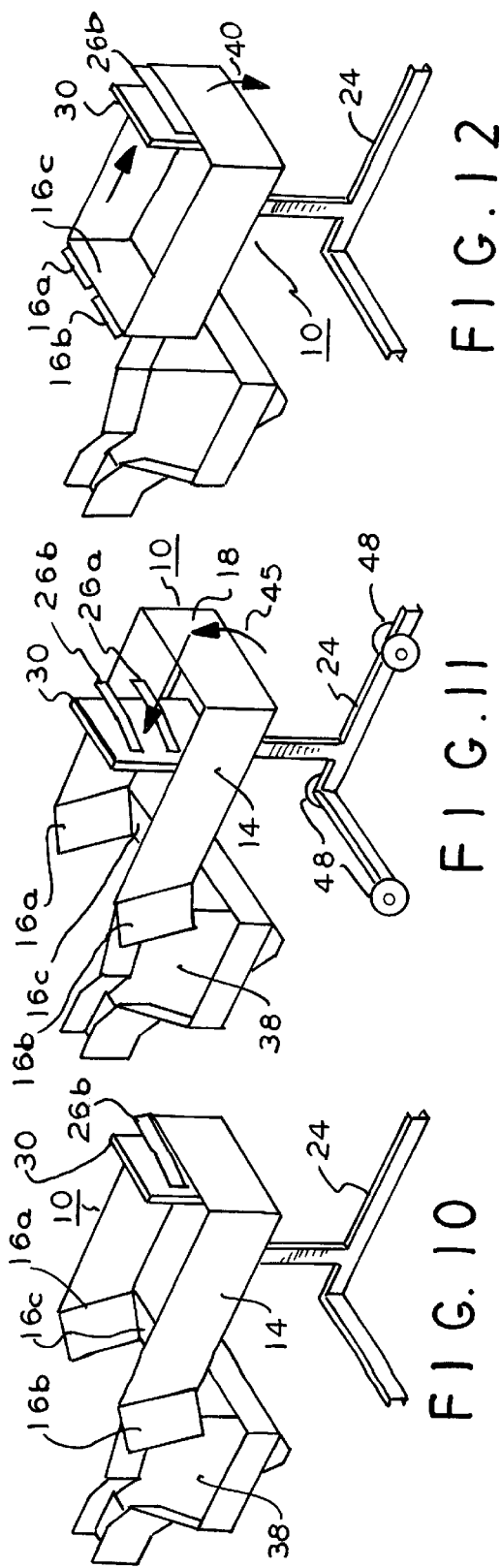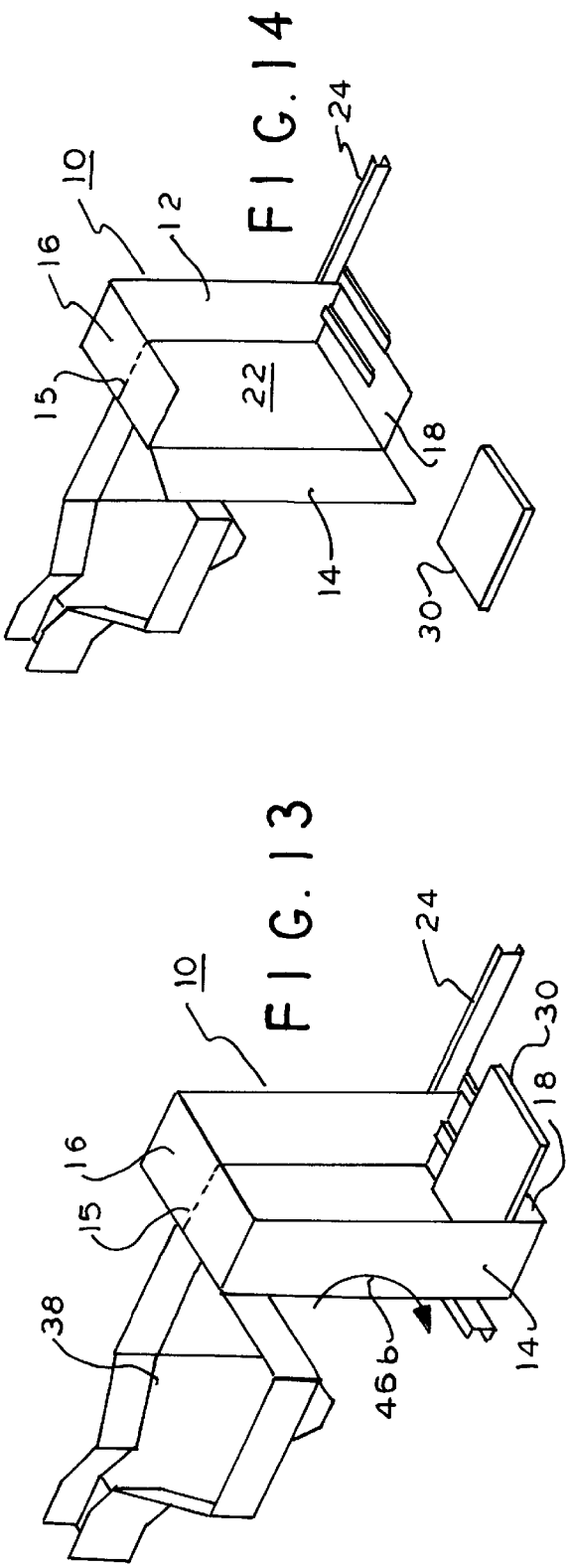

PALLET UNLOADING APPARATUS AND METHOD

BACKGROUND OF THE INVENTION

1. Field of the Invention

The present invention relates to apparatus and methods for transferring products from a storage/transport vehicle to a work station. In particular, the invention relates to apparatus and methods for unloading, at high speed, a large quantity of products, such as empty plastic containers or bottles, stacked in tiers on the pallet.

2. Prior Art

Apparatus which fills empty bottles and/or containers at an high production rate require a large quantity of empty bottles or containers for continuous operation. High speed apparatus has been developed for securing and orienting empty bottles or containers stored in a hopper or bin. Such apparatus uses large quantities of empty bottles or containers, in short periods of time. An example of patents that teaches high speed container positioning and orienting apparatus are the U.S. Pat. No. 4,681,209, issued to Marti in July 1987 and the U.S. Pat. No. 5,415,322, issued to Sala in May 1995. The teachings in these patents include the automatic securing, positioning and aligning of each of a large quantity of empty bottles or containers, such as plastic bottles or containers, for example, on a bottle-by-bottle basis, at an high speed. In order that this type of high speed apparatus operate continuously, a large quantity of empty bottles or containers need be fed to the apparatus. In practice, large quantities of empty bottles are loaded on to pallets, in stacks of tiers and are transported, by fork-lift or other vehicle, for example, to the high speed bottle or container unloading apparatus.

The tiers defining the stack on the pallet normally include a tier or support sheet on which a quantity of containers are aligned, utilizing the upper surface of the tier or support sheet. Depending upon the size of the bottles or containers, a tier of plastic bottles, for example, may include as many as 200 to 300 plastic bottles. The pallet is stacked with as many tiers as practical, considering the size of the bottle or container stored in the stack. If, for example, the bottles or containers are six (6) to ten (10) inches in height, the stack may include as many as eight (8) to eleven (11) tiers. The stacking or cascading of so many tiers on a four foot by four foot pallet makes a relatively unstable package or load. Also, bottles or containers of such size, especially empty, plastic bottles, are very light in weight, further increasing the instability of the load. In order to stabilize the load, the stack on the pallet is wrapped with a plastic or paper wrap or sheeting and/or is often banded with bands or straps. The sheeting wrap closely envelopes the stack so that the wrapping both supports the stack and keeps empty containers clean during shipping and/or storage. Bands, which may also be used, further secure the load to the pallet and support and stabilize the load on the pallet. The bands may extend longitudinally about or over the load on the pallet. The bands used to secure the load are often secured to or extended about the pallet thus tying the load to the pallet providing additional support. Stabilizing the load in this manner is effective, inexpensive and practical and is in common use in the field. However, the problems of removing the sheeting and the bands or straps from the stack are not addressed in the prior art.

Apparatus for unloading pallets stacked with bottles or containers is the subject of several U.S. patents. Examples of U.S. patents which teach apparatus for unloading a pallet stacked with tiers of products, such as cartons, cases, bottles or containers are:

| | | |
|---|---|---|
| #3,543,949 | to Weier | 1970; |
| #3,724,686 | to Nelson | 1973; |
| #4,037,734 | to Erdman | 1977; |
| #4,527,930 | to Biery | 1985; |
| #5,033,929 | to Marti | 1991. |

The patents to Weier ('949); to Nelson ('686); to Biery ('940); and to Marti ('929) each teach apparatus for incrementally elevating the pallet and the stack of tiers loaded on the pallet. As the pallet and load on the pallet are incrementally raised, each top tier is removed from the stacked load. Removal of the tier is accomplished at a particular level or work zone in the apparatus. When the tier enters the work zone, each tier is individually unloaded from the stack by a product handling apparatus. Each of the above identified U.S. patents teach apparatus for unloading a pallet on a tier-by-tier basis. The presence and the removal of the sheet wrapping from around the stack is not addressed. The presence and removal of the bands from around the stack are not addressed, and the presence and removal of the tier sheets defining the stack, are not mentioned or addressed in any of the above mentioned U.S. patents. Erdman ('734) teaches a speciality apparatus for unloading tiers of cases of bottles, stacked on a pallet, where a case defines a tier in the stack. The cases in the stack are oriented so that the opening of each case is at the bottom of the case in the stack. Erdman teaches inverting each case as it is removed from the stack of cases. The pallet, loaded with inverted cases containing bottles, is placed in a flat frame and the flat frame, the pallet and the stack are pivoted so that the pallet and the stack are rotated from a vertical orientation to an horizontal orientation. Erdman teaches removing each case from the horizontally laid stack of cases on a case-by-case, or tier-by-tier, basis. Marti ('929), while teaching tier-by-tier handling of a stack of tiers, with incremental stack elevation, also teaches a special construction for the tier sheet, with apparatus for securing and pivoting the upper most tier on the stack, so that the products supported by one specially constructed tier sheet are dumped into a hopper or a bin on a tier-by-tier basis. Marti ('929) is limited, requiring a specially constructed tier sheet, without which the teaching does not appear to be practical.

In summary, the prior art addresses the problem of unloading products stored in a stack of tiers, stacked on a pallet on a tier-by-tier basis, effectively maintaining the integrity of the stack of tiers during unloading. The efficiency of the prior art leaves much to be desired. The present invention addresses the problem of unloading products stored in a stack of tiers stacked on a pallet by providing a movable holding chamber for securing the pallet and stack of tiers, apparatus for destroying the stack of tiers held in the holding chamber for releasing the products from the stack environment, and apparatus for delivering the products previously held in the stack, for efficient, high speed unloading of products stacked in tiers, on a pallet.

SUMMARY OF THE INVENTION

The present invention provides a box-like, or carrier container, with open top or face, the carrier container defining a holding chamber. The carrier container is coupled to apparatus for rotating and otherwise moving the carrier container from one orientation, such as a vertical orientation, to a another orientation, an horizontal orientation, for example. The carrier container defines a box-like chamber, or holding chamber which is adapted to receive a pallet and a stack of tiers stacked thereon.

Each tier of the stack of tiers contains a plurality of products, such as empty plastic containers, for example, stacked on the pallet. Each tier is defined by a tier sheet or support sheet that supports a plurality of products. The invention provides a method and apparatus for unloading a plurality of articles or products stored in groups on tiers or layers in a stack of tiers or layers, vertically oriented and stacked on a pallet. The unloading of the products from the stack of tiers is done on an unitary basis, that is, the stack of tiers, the products and the pallet are handled as a unit, as opposed to the prior art which unloads articles from tiers stacked on pallets on a tier-by-tier basis. The present invention provides apparatus for securing the stack of tiers and pallet in a holding chamber of a carrier container or vehicle container, rotating the container holding the pallet and stack and destroying the stack held in the holding chamber. The products, for example empty plastic containers, formerly retained and held captive in a stacked tier environment, are released in the holding chamber, forming a jumbled mass of empty plastic containers. The jumbled mass of freed plastic containers is delivered, in mass, to container storage means or other container handling means.

The pallet and stack of tiers stacked thereon are delivered to the vehicle or carrier container and placed in the holding chamber of the carrier container. With the pallet and stack of tiers in the holding chamber, the container is rotated or moved from a standing, vertical orientation to an horizontal orientation, with the open portion of the carrier container oriented upward. As the carrier container is rotated, the pallet and stack of tiers held in the holding chamber of the carrier container, are carried with the carrier container.

The invention provides for removing the sheet wrapping, such as paper or plastic sheeting or wrap, for example, wrapped around the stack, for removing the bands or straps around the stack and, with the stack and pallet secured in the holding chamber, provides for grasping or securing the individual tier sheets and removing the tier sheets from the stack. With the sheet wrapping and the bands removed from the stack, the tier sheets or tier supports are removed, destroying the stack, releasing the plastic containers from the stack environment. Removal of the tier sheets destroys the stack leaving the plastic containers in a jumbled mass, within the holding chamber of the carrier container. Removal of the tier sheets from the stack is accomplished when the stack is contained within the holding chamber of the carrier container and the carrier container is in a substantially horizontal orientation, with the open portion of the carrier container oriented upward.

Preferably, the carrier container is provided with a collapsible end that, when collapsed, forms a pouring spout. When the pouring spout is formed, the jumbled mass of plastic containers in the holding chamber of the carrier container, is poured out of the holding chamber, as desired. Unloading the jumbled mass from the holding chamber of the carrier container is accomplished by collapsing the collapsible end of the carrier container and rotating the carrier container so that the jumbled mass of plastic containers pours out the spout. Alternatively, apparatus is provided to move or push the jumbled mass out of the pouring spout. Apparatus, in the form of one or more drive fingers and a drive means, for example, for moving the fingers and driving the pallet along the interior of the holding chamber, toward the pouring spout, may be provided. In driving the pallet along the interior of the holding chamber toward the pouring spout, the jumbled mass is pushed toward the open end of the holding chamber and out the pouring spout while maintaining the carrier chamber horizontal.

After the mass of empty containers are unloaded from the holding chamber, the carrier container is reoriented to a vertical orientation and the pallet is removed from the holding chamber.

The apparatus for rotating and/or moving the carrier container and for opening and closing the collapsible end thereof may be conventional drive means, with gearing and/or linkage coupled to the carrier container. The drive for rotating and/or positioning the carrier container may be mechanical, electrical, hydraulic or pneumatic or any other type drive means. The carrier container moving apparatus preferably rotates the carrier container from a standing or vertical position, standing on an end of the container, to a substantially horizontal position, through substantially ninety degrees of rotation. After the stack of tiers is destroyed and the captive empty plastic containers of the stack are released within the holding chamber, the carrier container is tilted to slide the jumbled mass of plastic containers toward pouring spout formed by the collapsed end of the carrier container, through the pouring spout and into a hopper, bin or other storage means, as desired. After the mass of empty plastic containers is unloaded from the holding chamber of the carrier container, the collapsible end is re-formed and the carrier container is rotated to a vertical orientation, standing on its end. The pallet is removed from the holding container and another pallet and stack of tiers may be loaded into the holding chamber of the carrier container, to effect mass unloading of the containers in the stack of tiers.

BRIEF DESCRIPTION OF THE DRAWINGS

FIG. 1 is a representation of the invention showing a pallet loaded with a stack of tiers, wrapped with a plastic sheet, the pallet loaded with the stack of tiers standing next to the invention;

FIG. 2 is a representation of the invention, pallet and stack represented in FIG. 1, with the plastic sheet partially removed from the stack of tiers;

FIG. 3 is a representation of the invention, pallet and stack represented in FIG. 2, with the plastic sheet removed from the stack and with support bands represented around the stack;

FIG. 4 is a representation of the invention, pallet and stack represented in FIG. 3, with the pallet and stack of tiers received in the holding chamber;

FIG. 5 is a representation of the invention, pallet and stack represented in FIG. 4, with the walls of the carrier container closed;

FIG. 6 is a representation of the invention, pallet and stack represented in FIG. 5, with the carrier container reoriented, supporting the pallet and stack;

FIG. 7 is a representation of the invention, pallet and stack represented in FIG. 6 in a further stage of operation;

FIG. 8 is a representation of the invention, pallet and stack represented in FIG. 7, with the tier sheets being removed from the stack of tiers;

FIG. 9 is a representation of the invention represented in FIG. 8, representing the carrier container supporting the destroyed stack of tiers;

FIG. 10 is a representation of the invention represented in FIG. 9, representing the carrier container with the collapsible end open for dumping the mass of products held in the holding chamber;

FIG. 11 is a representation of the invention represented in FIG. 10, representing two embodiments for dumping the jumbled mass of products from the holding chamber;

FIG. 12 is a representation of the invention represented in FIG. 10, representing partial reorientation of the carrier container;

FIG. 13 is a representation of the invention represented in FIG. 12, representing full reorientation of the carrier container; and, FIG. 14 is a representation of the invention represented in FIG. 3, representing the invention in stand-ready position, after a cycle of operation.

DETAILED DESCRIPTION OF THE INVENTION

For convenience and clarity, identical parts and components represented in the drawings are identified with identical call-out numbers and/or letters. The invention, represented in the Figs., provides for a vehicle or carrier container 10 defined by sides 12 and 14, ends 16 and 18 and a bottom 20. The carrier container is preferably open faced. The sides, ends and bottom define a holding chamber 22. One of the ends, such as 16, is openable or collapsible as represented by broken line 15 and represented more broadly in FIGS. 10 and 11. In its collapsed form, end 16 forms a conducting means or pouring spout for channeling products out of the holding chamber. In an alternative structure, the bottom 20 may be openable, in lieu of the end, if desired. The carrier container is mounted on a drive frame 24. The drive frame 24 represents conventional apparatus including a drive means, gears and/or linkage, coupled to the carrier container, for rotating, raising and lowering the carrier container, and for opening and closing the collapsible end of the carrier container. Rotation on an axis, such as 44, in FIG. 6, for example, may be accomplished via conventional gearing, drive and/or linkage between the carrier container and the drive frame. The drive means, not shown, may be mechanical, electrical, pneumatic or hydraulic. When practicing the invention, conventional gearing and/or linkage may be used with a drive means, to move or the carrier container and to open and close the collapsible end of the carrier container, in accordance with the invention defined herein. An alternative structure represented in the form of a pair of movable fingers 26a and 26b are connected to the drive means for moving longitudinally within the holding chamber. The movable fingers move with the carrier container and are driven independent of the carrier container.

A pallet 30, with a stack of tiers 33 stacked on the pallet, is represented. The stack of tiers is covered by a sheet wrapping 32, which is more clearly represented in FIG. 2, in stage of removal from the stack. The stack of tiers is defined by a plurality of tier sheets 34 spaced by products, such as empty plastic containers or bottles, for example, loaded on and supported by each tier sheet. Each tier sheet, except the top tier sheet in the stack supports a plurality of empty plastic containers represented by short lines 36 between the tier sheets 34, in FIG. 2. A hopper or bin 38 represents a container or storage means, hopper or bin into which the empty plastic containers stored in the stack 33 are delivered.

The sheet wrapping 32, which may be plastic sheeting, paper or other sheeting, is wrapped around the stack of tiers and provides security and stability to an otherwise unsecured and unstable load. The wrapping also covers the stack or load, keeping the contents of the stack clean. Preferably the sheet wrapping is removed from the stack before the pallet and stack are moved into the holding chamber of the carrier container. Preferably, the sheet wrapping is cut substantially longitudinally of the stack and removed from the stack, as represented at 37. It is usual practice to move the pallet and stack about using a fork-lift vehicle.

The stack of tiers may be further supported by securing the stack to the pallet with bands or straps, such as represented at 40 and 41 of FIG. 3. The bands extend up and down the sides and across the top of the stack and may be secured to the pallet, further stabilizing the stack of tiers on the pallet. It is to be noted that empty plastic containers or bottles are very light in weight and when loaded on a pallet in a stack of tiers, forms an unstable load. It is convenient and economical to store and move empty plastic containers or bottles in stack of tiers, loaded on a pallet. To stabilize the inherently unstable load and, at the same time keep the contents of the load clean, the stack of tiers is wrapped with an inexpensive sheeting material, such as plastic sheeting, for example. To further stabilize the load, the stack may be banded with bands or straps and may be secured to the pallet. In order to dump or unload the contents of the stack, that is, the empty plastic containers, for example, the sheet wrapping needs be removed and, if the stack is banded, the bands or straps need be removed. After the sheeting wrapped around the stack is removed, the pallet and stack of tiers is moved into the holding chamber of the carrier container. In FIGS. 3, 4 and 14, the side 14 of the carrier container is represented open. In FIGS. 1, 2, 5 and 13 the side 14 of the carrier container is represented closed. In practicing the invention the side 14 may be fixed or openable, as desired. With the side 14 openable, the side 14 may be opened during loading, for example, providing more room to maneuver the pallet and stack. In the preferred embodiment the side 14 is openable. The end 16 is preferably collapsible for forming a pouring spout, 16a, 16b and 16c, for the carrier container.

The size of the carrier container and the size of the holding chamber are preferably sufficiently large to accept and contain the pallet and the whole of the stack of tiers loaded on the pallet. When the pallet and stack of tiers is received in the holding chamber, such as represented in FIG. 5, for example, the carrier container is rotated. The axis 44, shown in broken line form in FIG. 6, represents one axis on which the carrier container may be rotated. The carrier container is rotated from a vertical orientation, such as represented in FIG. 5, for example, to an horizontal orientation, represented in FIG. 6, for example. Preferably, the carrier container carrying the pallet and stack of tiers in the holding chamber is lowered, as in FIG. 7. In the lowered, horizontal position of the carrier container, the bands 40 and 41, if used on the stack of tiers, are severed so as to release the stack of tiers from the pallet. The bands are each cut by a cutting means 43, releasing the stack from the pallet. The bands may be removed, as represented at 42, in FIG. 8.

When the carrier container is in a substantially horizontal position, as represented in FIG. 8, for example, each tier sheet in the stack of tiers is removed from the stack of tiers. Each tier sheet is secured and/or grasp by a clamping means represented at 35/39, and extracted, 39a, from the holding chamber. The removal of the tier sheets from the stack of tiers effectively destroys the stack, which is represented in broken line form, 33a in FIGS. 8 and 9.

With the destruction of the stack of tiers, the contents of the stack, empty plastic containers, for example, is released from the captive environment of the stack and the contents becomes a jumbled mass of empty plastic containers, held in the holding chamber of the carrier container. The sections 16a, 16b and 16c of the end 16 of the carrier container open, forming a pouring spout for the carrier container 10, as represented in FIGS. 10 and 11. In FIGS. 10, 11 and 12 the end 16 is represented as a three (3) piece end which forms a three piece spout, when open.

The carrier container, with the jumbled mass in the holding chamber is rotated, as represented by the arrow 45, toward the hopper or bin 38 for discharging the load of empty plastic containers into the storage hopper 38. Alternatively, the fingers 26a and 26b may be driven from the end 18 of the carrier container toward the open end 16, pushing the jumbled mass of plastic containers out of the holding chamber.

After the jumbled mass is unloaded from the carrier container, the sections of the collapsible end 16 close and the carrier container is rotated, such as represented by the arrow 46a in FIG. 12 and arrow 46b in FIG. 13 and lowered to a vertical, standing position, standing on the end 18. FIG. 14 represents that the pallet 30 is removed from the holding chamber 22.

Connection between the carrier container and the drive frame and/or support frame 24 may be any of several conventional instrumentation protocols. The vertical and the rotational movements of the carrier container and the opening and closing of the collapsible end may be by conventional gear or piston action driven mechanically, electrically, hydraulically or pneumatically, for example. The drive frame may be mobile, as represented at 48 in FIG. 11, for moving the invention between storage hoppers or bins. The stack of tiers may include a top tier sheet and/or a top frame, that is positioned directly on top of or over the top layer of bottles or containers, for example, in the stack, to provide protection for the top layer of bottles and to maintain the integrity of the stack. The top sheet and/or the top frame (not shown) may be removed from the stack in the same manner as if each were a tier sheet.

In the forgoing description of the invention, certain terms have been used for conciseness, clearness and comprehension; however, no unnecessary limitations are implied from or because of the terms used, beyond the requirements of the prior art, because such terms are used for descriptive purposes and are intended to be broadly construed.

Having described a preferred embodiment of the invention, in terms of features, discoveries and principles, along with certain alternative construction and use, other changes and/or use that will become apparent to those skilled in the art, may be made, without departing from the scope of the invention as defined in the appended claims.

What is claimed is:

1. An apparatus for unloading a plurality of products arranged in groups on each tier support means of a plurality of tier support means disposed in a stack of tiers, vertically oriented and supported on a pallet means, said apparatus comprising:
   a) a carrier means defined by opposing sides, opposing ends and a bottom connected for defining a holding chamber carried by said carrier means, said holding chamber for receiving said stack of tiers supported on said pallet means;
   b) a first drive means connected to said carrier means for rotating said carrier means from a first orientation to a second orientation for securing said stack of tiers and said pallet means;
   c) means for removing said each tier support means from said stack secured in said carrier means, for destroying said stack of tiers and for releasing said plurality of products from a stack environment;
   d) means for opening at least one end of said opposing ends for defining a pouring spout for said holding chamber; and,
   e) second drive means connected to said carrier means for rotating said carrier means from said second orientation and for pouring said plurality of products out of said holding chamber.

2. An apparatus for unloading a plurality of products arranged in groups on each tier sheet means of a plurality of tier sheet means disposed in a stack of tiers vertically oriented and supported on a pallet means, said apparatus comprising:
   a) a carrier means having at least a first side and a second side, a first end and a second end and a bottom connected for defining a holding chamber means for receiving said stack of tiers supported on said pallet means;
   b) a first drive means connected to said carrier means for rotating said carrier means from a first orientation for receiving said stack of tiers and said pallet means in said holding chamber to a second orientation for securing said stack of tiers and said pallet means in said holding chamber;
   c) a means for removing said each tier sheet means from said stack of tiers secured in said holding chamber and releasing said plurality of products from said stack of tiers;
   d) a conducting means for conducting said plurality of products from said holding chamber; and
   e) a means for urging said plurality of products to said conducting means for conducting said plurality of products out of said holding chamber.

3. Apparatus for unloading a plurality of products as in claim 2 and in which said conducting means is a pouring spout means defined by a first section, a second section and a third section of said first end.

4. Apparatus for unloading a plurality of products as in claim 3 and in which said means for urging includes a drive means connected to said carrier means for urging said plurality of products toward said pouring spout means.

5. Apparatus for unloading a plurality of products as in claim 2 and in which said means for urging includes a drive means for driving said pallet means toward said conducting means.

6. Apparatus for unloading a plurality of products as in claim 2 and in which said means for urging includes
   a) at least a first finger means and a drive means connected to said first finger means for driving said first finger means for urging said pallet means toward said conducting means for urging said plurality of products toward said conducting means.

7. Apparatus for unloading a plurality of products as in claim 2 and in which said conducting means is defined by at least a first section and a second section and a third section, each of said first end, for collapsing said first end for defining a pouring spout.

8. Apparatus for unloading a plurality of products as in claim 7 and further including a drive means connected to said carrier means for urging said plurality of products toward said pouring spout.

9. A method for unloading a plurality of products arranged in groups on each tier sheet means of a plurality of tier sheet means disposed in a stack of vertically oriented tiers and supported on a pallet means including the steps of:
   a) loading said stack of tiers supported on said pallet means and said pallet means into a holding chamber means when said holding chamber means is in vertical orientation, standing on an end of said holding chamber means;

b) rotating said holding chamber means from said vertical orientation to a horizontal orientation, securing said stack of tiers and said pallet means in said holding chamber means;

c) removing said each tier sheet means from said stack of tiers for destroying said stack of tiers and for releasing said plurality of products from said stack of tiers;

d) rotating said holding chamber means from said horizontal orientation to a tilt orientation for pouring said plurality of products out of said holding chamber means.

10. A method for unloading a plurality of products arranged in groups on each tier sheet means of a plurality of tier sheet means, disposed in a stack of tiers vertically oriented on and secured to a pallet means including the steps of:

a) loading said stack of tiers and said pallet means to which said stack of tiers is secured into a holding chamber defined by five connected sheet means when said holding chamber is vertically oriented;

b) sectioning one sheet means of said five connected sheet means for collapsing said one sheet means into a pouring spout means for said holding chamber;

c) rotating said holding chamber to a horizontal orientation for retaining said stack of tiers and said pallet means in said holding chamber;

d) removing said each tier sheet means of said plurality of tier sheet means from said stack of tiers for destroying said stack of tiers and releasing said plurality of products from said stack of tiers;

e) collapsing said sections of said one sheet means into said pouring spout means for said holding chamber; and f) rotating said holding chamber from said horizontal orientation toward said pouring spout means for draining said plurality of products from said holding chamber.

* * * * *